Patented Feb. 7, 1950

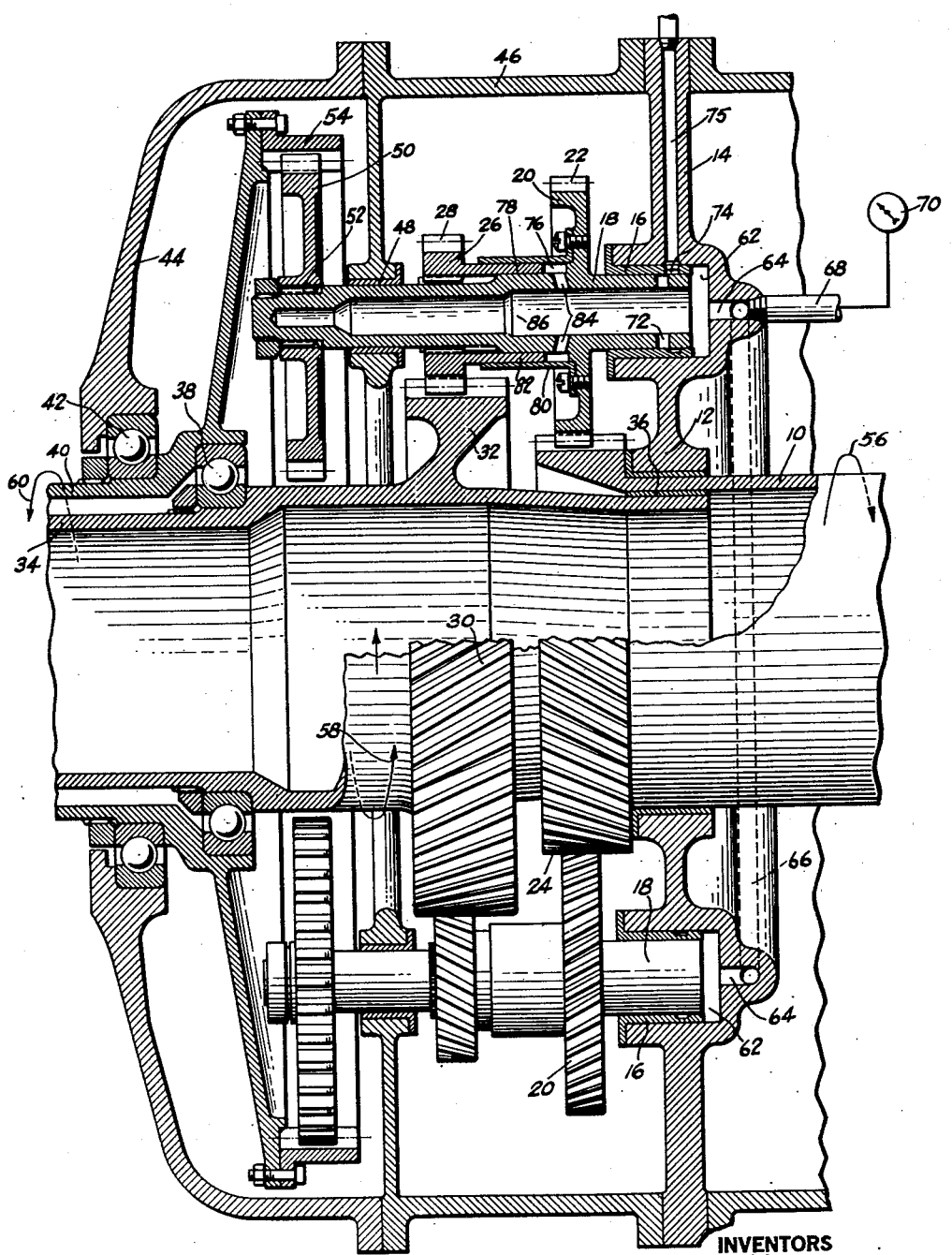

2,496,857

UNITED STATES PATENT OFFICE 2,496,857

REDUCTION GEAR UNIT

Val Cronstedt, Malboro, and Alexander H. King, West Hartford, Conn., assignors to United Aircraft Corporation, East Hartford, Conn., a corporation of Delaware Application November 14, 1947, Serial No. 785,948

6 Claims. (Cl. 74—410)

This invention relates to reduction gear drives particularly to a drive adapted for a dual rotation propeller or other dual rotation drives.

For the purpose of uniformly distributing the load between the several power shaft gears in a single reduction gear drive, it is customary to provide helical teeth on the gears and to balance the resulting axial thrusts of the gears against one another either hydraulically or mechanically. This arrangement is adequate in a simple type of reduction unit involving a single stage of reduction; however, in a dual rotation unit or in a unit having two separate driven shafts, the direct multiplication of the load balancing elements would result in a cumbersome construction. A feature of this invention is an arrangement of this type of reduction unit adapted for driving two output shafts.

A feature of the invention is an arrangement for uniformly distributing the loads on the gears of a dual rotation gear unit.

The hydraulic system used for balancing the axial thrusts on the gears utilizes a valve forming a part of one of the axial movable elements by which to maintain in the system sufficient fluid to hold the gears in operative axial position. A feature of the invention is the maintenance of the hydraulic system for the entire unit by a single valve.

Other objects and advantages will be apparent from the specification and claims, and from the accompanying drawing which illustrates an embodiment of the invention.

The single figure is a sectional view through the reduction gear unit.

The power input shaft 10 of the unit is journalled in a bearing 12 carried by a supporting plate 14 forming a part of the frame for the unit. The plate or cage 14 also has a number of circumferentially spaced bearings 16 which support jack shafts 18 parallel to and circumferentially spaced around the power input shaft. Each jack shaft carries a gear 20 having helically arranged teeth 22 meshing with similarly arranged teeth on a gear 24 on the input shaft.

Splined to the jack shafts 18 and axially slideable thereon are other pinions 26 each having helically arranged teeth 28 meshing with cooperating teeth 30 on a gear 32 on one of the driven shafts 34. This shaft may be carried at its inner end by a bearing 36 located inside of input shaft 10 and the shaft may be additionally supported by bearings 38 placed between the shaft 34 and the inner end of the second power output, or driven, shaft 40. The shaft 40 may in turn be supported by bearing 42 carried by the end housing section 44 which is connected to the center housing section 46.

Each jack shaft, which may be additionally supported by bearings 48 carried by the center housing section 46 carries at its end a gear 50 keyed or splined as at 52 to the shaft. The gears 50 mesh with a ring gear 54 on the inner end of the second output shaft 40. Thus as the input shaft 10 rotates, it drives the jack shafts and in turn imparts rotation in opposite directions to the two output shafts 34 and 40. The rotation of the input shaft 10 is in the direction of the arrow 56. It will be apparent that the inner shaft 34 rotates in the same direction as indicated by the arrow 58 and the shaft 40 rotates in the opposite direction as indicated by the arrow 60.

With the teeth 22 and 24 helically arranged as shown, the rotation of the power input shaft 10 imparts to the jack shafts 18 not only a rotation but also an axial thrust toward the right. To balance this thrust, the bearings 16 form the cylindrical walls of cylinders 62 in which the jack shafts are slideable as pistons. The several cylinders 62 are interconnected by axial passages 64 and an interconnecting annular passage 66 in the plate 14 which is mounted on the center housing section. A conduit 68 from the passage 66 may be connected to a gauge 70 which will indicate the torque applied to the power input shaft.

To maintain the pinions 20 in the proper axial relation to the gear 24, one of the jack shafts has one or more ports 72 in the side wall thereof which communicate with a groove 74 in the bearing 16. Fluid is supplied to the groove 74 by a passage 75 in plate 14. As the jack shaft moves to the right under an increasing load, the available port area 72 increases and permits additional fluid to enter the cylinders 62 thereby replacing any oil that may have leaked from the system and also developing the necessary pressure within the cylinders to balance the thrust on the shafts and to maintain the proper position of the gears 22. It will be apparent that only one of these valve arrangement which includes the groove 74 and ports 72 need be provided since all of the cylinders 62 are interconnected.

The rotation of the jack shaft 18 imparts rotation to the pinions 26 thereon and thence to the intermeshing gear 32. The axial thrust resulting from the helically arranged teeth tends to move the gears 26 toward the right until they are all carrying equal loads. The movement of these gears to the right is resisted by fluid pressure acting in cylinders 76 formed between a cylindrical surface 78 on the jack shaft and an outer cylindrical flange 80 attached to the gear 20. Each gear 26 has an integral sleeve 82 fitting within the cylinder 76 and forming an annular piston. Fluid pressure is admitted to the cylinder 76 through ports 84 in the jack shaft which communicate by means of a bore 86 in the shaft with the cylinder 62. Thus by maintaining the proper pressure in the cylinders 62 the proper pressure is also maintained in the cylinder 76.

Since the gears 20 can move axially until the same axial thrust is applied to each gear, it is apparent that all of the gears 20 will be equally loaded, or in other words, power will be transmitted uniformly through all of the gears 20. If the gears 50 on the jack shafts are not uniformly loaded, the axial movement of one of the gears 20 with respect to the other will produce a change in the annular positions of the several gears 50 and thereby assure that all of these gears are also uniformly loaded. The same effect occurs with the gears 26 which will move axially as the reduction gear unit is driven until the pressures are the same in all of the cylinders 76 thereby assuring uniform distribution of the load.

By this arrangement it becomes possible to provide for the rotation of a pair of shafts as in a dual rotation drive by a number of jack shafts carrying gears certain of which have helically arranged teeth with a system of cylinders and pistons resisting the resulting axial thrust and in all of which the pressures are maintained at the desired value by a single control which may form a part of one of the elements that is caused to move axially in assuring proper tooth loading. It will be obvious that the torque applied to the input shaft 10 is a direct function of the pressure developed in the cylinders 62 and 76 and the gauge 70 will give a true indication of the torque developed in the unit.

It is to be understood that the invention is not limited to the specific embodiment herein illustrated and described, but may be used in other ways without departure from its spirit as defined by the following claims.

We claim:

1. In a reduction unit, a power input shaft, a pair of driven shafts, a plurality of jack shafts arranged around said power input shaft, a gear carried by each jack shaft and each gear having helically arranged teeth, a gear on said power input shaft meshing with said jack shaft gears, each of said jack shaft gears being axially slidable relative to the gear on the input shaft, gears connected to each of said driven shafts and other gears on each jack shaft meshing with said driven shaft gears, the gear connected to one of the driven shafts and the gears on the jack shaft meshing therewith having helically arranged teeth, said last mentioned helical gears on the jack shaft being axially slidable relative to the intermeshing gear and hydraulic means for separately resisting the axial movement of each set of the helical tooth gears on the jack shafts relative to the gear on the power input shaft and the gear on the driven shaft meshing therewith.

2. In a reduction unit, a power input shaft having a helical gear thereon, a plurality of jack shafts arranged around the shaft and each having helically toothed gears thereon meshing with the gear on the input shaft, a cage supporting the jack shafts and having at the end of each shaft a first cylinder in which a part of the jack shaft moves as the piston, fluid interconnection between said first cylinders and means for maintaining a pressure in said cylinders, a pair of output shafts each having a gear thereon, gears on each jack shaft meshing with the gears on said output shafts, one of said output shaft gears and its associated intermeshing jack shaft gears having helically arranged teeth, thereby to impart an axial thrust to said associated jack shaft gears, said last mentioned gears being axially slideable on the jack shafts, cylinders formed on said jack shafts and communicating with said first cylinders, each of said associated jack shaft gears having a part thereof fitting in one of the cylinders formed on the jack shafts, the pressure in said first cylinders being transmitted to the cylinders on the jack shafts to resist the axial thrust on said associated jack shaft gears.

3. In a reduction unit, a power input shaft having a helical gear thereon, a plurality of jack shafts arranged around the shaft and each having helically toothed gears thereon meshing with the gear on the input shaft, a cage supporting the jack shafts and having at the end of each shaft a first cylinder in which a part of the jack shaft moves as the piston, a fluid interconnection between said first cylinders, and means for maintaining a pressure in said cylinders, said maintaining means including a valve movable with said jack shaft and cooperating with a port in the associated cylinder wall to control the fluid supply to the cylinder in response to axial movement of the jack shaft relative to the cylinder, a pair of output shafts each having a gear thereon, gears on each jack shaft meshing with the gears on said output shafts, one of said output shaft gears and its intermeshing jack shaft gears having helically arranged teeth thereby to impart an axial thrust to said associated jack shaft gears, said last mentioned gears being axially slideable on the jack shaft, cylinders formed on said jack shaft and having fluid connection with said first cylinders, each of said associated jack shaft gears having a part thereof fitting in one of the cylinders formed on the jack shafts, the pressure in said first cylinders being transmitted to the cylinders on the jack shafts to resist the axial thrust of said associated jack shaft gears.

4. In a reduction unit, a power input shaft having a helical gear thereon, a plurality of jack shafts arranged around the shaft and each having helically toothed gears thereon meshing with the gear on the input shaft, a cage supporting the jack shafts and having at the end of each a first cylinder in which a part of the jack shaft moves as the piston, a fluid interconnection between said first cylinders and means for maintaining a pressure in said cylinders, a pair of output shafts each having a gear thereon, gears on each jack shaft meshing with the gears on said output shafts, one of said output shaft gears and its intermeshing jack shaft gears having helically arranged teeth, thereby to impart an axial thrust to said associated jack shaft gears, said last mentioned gears being axially slideable on the jack shaft, cylinders formed on said jack shaft communicating with said first cylinder, each of said associated jack shaft gears having a part thereof fitting in one of the cylinders formed on the jack shafts, the pressure in said first cylinders being transmitted to the cylinders on the jack shafts to resist the axial thrust on said associated jack shaft gears, the helically toothed gears on the jack shafts meshing with the input gear being supported against axial movement on said jack shafts.

5. In a speed change device providing an interconnection between a single shaft and a pair of concentric output shafts, said device including a helical gear on said single shaft, a plurality of jack shafts arranged around the helical gear and each having a helically toothed gear thereon meshing with the helical gear, said teeth on the jack shaft forming a first set of gears, a cage element supporting each jack shaft and providing a plurality of cylinders at the end of each shaft in which a part of each jack shaft moves as the piston, a fluid interconnection between said cylinders and means for introducing fluid under pressure to one of said cylinders, a gear on each of said pair of concentric shafts, gears on each jack shaft meshing with the gears on said output shafts, the gears on the jack shaft meshing with the gear on one of the pair of concentric shafts being a second set of gears, and the other gears on the jack shaft meshing with the gear on the other of the pair of concentric shafts being a third set of gears, the gear on one of said pair of concentric shafts and the gears on the jack shafts meshing therewith having helically arranged teeth, two of said sets of gears on the jack shafts being fixed against axial movement on the jack shaft and being supported for rotation with jack shaft, the other set of gears being axially slideable on the jack shaft, each gear of said other set of gears having part thereof forming a piston and each jack shaft having a cylinder thereon in which the piston part of the gear is slideable, and a fluid connection between each of said cylinders on the jack shaft and the cylinders in the cage at the ends of jack shafts.

6. In a speed change device providing an interconnection between a single shaft and a pair of concentric output shafts, said device including a helical gear on said single shaft, a plurality of jack shafts arranged around the helical gear and each having a helically toothed gear thereon meshing with the helical gear, said teeth on the jack shaft forming a first set of gears, a cage element supporting each jack shaft and providing a plurality of cylinders at the end of each shaft in which a part of each jack shaft moves as a piston, a fluid interconnection between said cylinders and means for introducing fluid under pressure to one of said cylinders, said last cylinder and the associated piston part of the jack shaft having cooperating ports to adjust the flow of fluid in response to axial movement of the jack shaft, a gear on each of said pair of concentric shafts, gears on each jack shaft meshing with the gears on said output shafts, the gears on the jack shaft meshing with the gear on one of the pair of concentric shafts being a second set of gears, and the other gears on the jack shaft in mesh with the gear on the other of the pair of concentric shafts being a third set of gears, the gear on one of said pair of concentric shafts and the gears on the jack shafts meshing therewith having helically arranged teeth, two of said sets of gears on the jack shafts being fixed against axial movement on the jack shaft and being supported for rotation with jack shaft, the other set of teeth being axially slideable on the jack shaft, each gear of said other set of gears having part thereof forming a piston, and each jack shaft having a cylinder thereon in which the piston part of the gear is slideable, and a fluid connection between each of said cylinders on the jack shaft and the cylinders in the cage at the ends of jack shafts.

VAL CRONSTEDT.
ALEXANDER H. KING.

REFERENCES CITED

The following references are of record in the file of this patent:

UNITED STATES PATENTS

| Number | Name | Date |
|---|---|---|
| 2,091,637 | Hoffman | Aug. 31, 1937 |
| 2,372,883 | Daub | Apr. 3, 1945 |
| 2,386,367 | Taylor | Oct. 9, 1945 |